(12) United States Patent
Krishnan

(10) Patent No.: US 7,149,676 B2
(45) Date of Patent: Dec. 12, 2006

(54) VARIABLE ACCURACY MODES IN MICROPROCESSOR SIMULATION

(75) Inventor: Sivaram Krishnan, Los Altos, CA (US)

(73) Assignee: Renesas Technology Corporation, Tokyo (JP)

( * ) Notice: Subject to any disclaimer, the term of this patent is extended or adjusted under 35 U.S.C. 154(b) by 527 days.

(21) Appl. No.: 09/888,189

(22) Filed: Jun. 21, 2001

(65) Prior Publication Data

US 2003/0009746 A1    Jan. 9, 2003

(51) Int. Cl.
*G06F 9/44*    (2006.01)

(52) U.S. Cl. ............ 703/21; 703/14; 703/13; 703/17; 703/22; 703/16; 703/19; 716/4

(58) Field of Classification Search ............ 703/13, 703/14, 16, 17, 19, 22, 21; 716/4
See application file for complete search history.

(56) References Cited

U.S. PATENT DOCUMENTS

| | | | |
|---|---|---|---|
| 6,230,114 B1 * | 5/2001 | Hellestrand et al. ......... 703/13 |
| 6,237,126 B1 * | 5/2001 | Bonitz ......................... 716/4 |
| 6,356,862 B1 * | 3/2002 | Bailey ......................... 703/16 |
| 6,370,494 B1 * | 4/2002 | Mizuno et al. ............... 703/17 |
| 6,507,809 B1 * | 1/2003 | Yoshino et al. .............. 703/21 |
| 6,625,572 B1 * | 9/2003 | Zemlyak et al. ............. 703/19 |
| 6,687,662 B1 * | 2/2004 | McNamara et al. ......... 703/14 |
| 2001/0034594 A1* | 10/2001 | Kohno et al. ................ 703/14 |
| 2003/0105620 A1* | 6/2003 | Bowen ........................ 703/22 |

* cited by examiner

*Primary Examiner*—Kandasamy Thangavelu
(74) *Attorney, Agent, or Firm*—Townsend and Townsend and Crew LLP

(57) ABSTRACT

The performance of a system is simulated in a method comprising: performing simulation in a first simulation mode for at least a first portion of code that models at least a portion of the system; and performing simulation in a second simulation mode for at least a second portion of code that models at least a portion of the system.

10 Claims, 3 Drawing Sheets

VARIABLE ACCURACY MODES IN MICROPROCESSOR SIMULATION

CROSS-REFERENCES TO RELATED APPLICATIONS

Not Applicable

FIELD OF THE INVENTION

This invention relates generally to the field of computer software, and more particularly to a simulator used to predict system performance.

BACKGROUND OF THE INVENTION

Simulators are often used to predict system (e.g., processor, memory, external modules, etc.) performance. Two common types of simulators used are functional simulators and performance (or cycle-accurate) simulators. Functional simulators simply emulate the semantic behavior of programs without giving information regarding execution times. On the other hand, performance simulators provide more detailed and accurate execution statistics including cycle times and detailed pipeline flows.

However, due to the detailed nature of performance simulators they are somewhat slow. It is not uncommon for performance simulators to be 1,000 times slower than functional simulators. Often, a program may take days or weeks to run on a performance simulator. Consequently, detailed performance simulators may be useless for all but small programs. Moreover, performance simulators are not readily integrated into larger simulation environments as a result.

One common use of simulators is analyzing the behavior of a small but critical code segment of a large program. The behavior of the remaining portions of the program is often irrelevant or of little relevance. It is often desired to gather statistics only for the small portion of code that is of interest. Since there is no easy mechanism for specifying the region of code of interest and limiting the gathering of statistics to that region alone, the statistics gathering is often polluted and takes longer than necessary.

SUMMARY OF THE INVENTION

The present invention includes a simulator that supports multiple simulation modes, in one embodiment functional and performance simulation modes, and lets a user select between the two modes (i.e., analyze different portions of code differently) and vary the accuracy of the performance simulation.

In a method according to one embodiment of the present invention, the performance of a system is simulated. The method comprises: performing simulation in a first simulation mode for at least a first portion of code that models at least a portion of the system; and performing simulation in a second simulation mode for at least a second portion of code that models at least a portion of the system.

In a system for simulating the performance of a system according to another embodiment of the present invention, the system comprises: a module for performing simulation in a first simulation mode for at least a first portion of code that models at least a portion of the system; and a module for performing simulation in a second simulation mode for at least a second portion of code that models at least a portion of the system.

A further understanding of the nature and advantages of the inventions herein may be realized by reference to the remaining portions of the specification and the attached drawings.

DESCRIPTION OF THE SPECIFIC EMBODIMENTS

Figure 1:
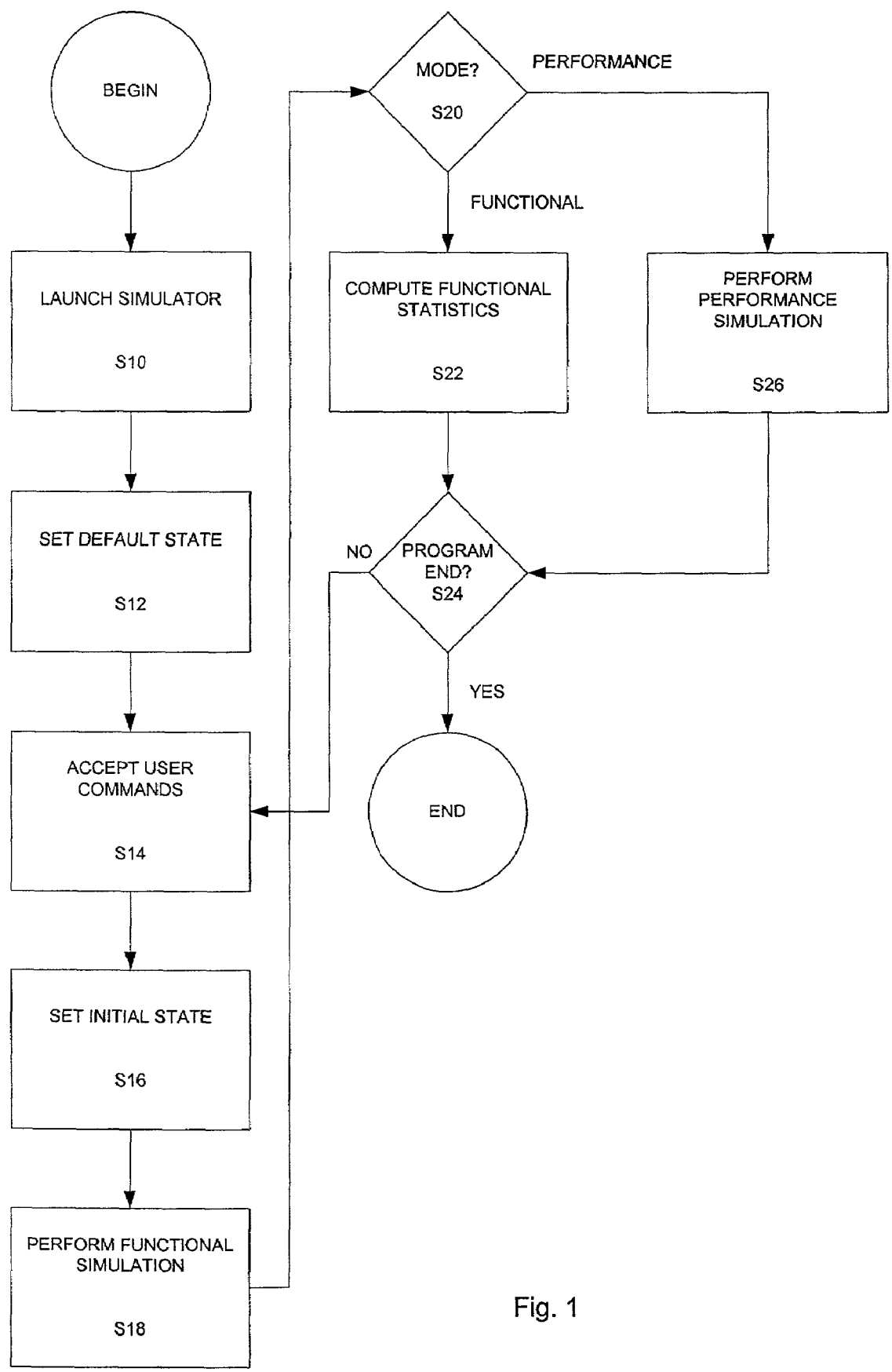
FIG. 1 is a flow diagram according to an embodiment of the present invention.

As shown in the exemplary drawings wherein like reference numerals indicate like or corresponding elements among the figures, an embodiment of a system according to the present invention will now be described in detail. The following description sets forth an example of a simulator system and methodology. The system can be operated on many different computing platforms, and other variations should be apparent after review of this description.

As mentioned previously, one embodiment according to the present invention provides a system that allows a user to perform both functional and performance simulation and allows the user to switch between the two modes as desired. This approach allows the user to run large programs quickly in the functional mode, while invoking the performance mode for various code regions of interest when it is important to examine cycle-accurate behavior. This system also allows the selective gathering of statistics. The user is given fine-grain control over the accumulation of statistics and the reported data is not polluted by data related to other portions of code.

Generally, in one embodiment the basic environment is functional simulation and all programs are executed in this environment. At specific points of interest within the code representing the device being simulated, the user can invoke performance simulation. These points of interest can be indicated by the user (e.g., by using breakpoints, etc.). The accuracy of the performance simulation can be varied from one code portion to another code portion.

In the performance simulation mode, the simulator provides system behavior information which may be cycle-accurate. The system can gather information related to processor pipelines, instruction and data buffers, branch predictions and penalties, cache and memory access times, etc. The performance simulation can be enabled and disabled at various points. These points include specific instruction addresses, data addresses, cycle counts, etc. By enabling and disabling the performance simulation at specific points of interest, e.g., procedure boundaries, it is possible to gather statistics for only that particular procedure(s). Additionally, by allowing initialization, clearing and printing of statistics at each of the desired points, it is possible to classify the data acquisition.

In one embodiment, since the functional and performance simulation are logically and programmatically separate, a well-defined interface between the two modes is provided. It is desirable to keep the information passing through this interface as minimal as possible to reduce the data transfer cost. One exemplary embodiment of the interface can be a trace element represented by the following C data structure:

```
struct trace_element
{
unsigned int ia;
unsigned int opcode;
unsigned int da;
unsigned int misc;
}
```

In one embodiment, the functional simulation engine initializes the above data structure when performance simulation is initiated. It is the responsibility of the performance simulation engine to process the trace_element data.

The performance simulation can be switched on or off at any regular breakpoint. Furthermore, finer grain control can be exercised over areas such as cache simulation, statistics gathering, etc. These aspects can be controlled via a graphical user interface (GUI), command line interface or the like.

An exemplary set of some possible commands are as follows:

| | | |
|---|---|---|
| ta_start | | start performance simulation |
| ta_stop | | stop performance simulation |
| ta_set | icache | enable icache simulation |
| ta_set | noicache | disable icache simulation |
| ta_set | log | print pipeline log |
| ta_set | stat | gather statistics |
| ta_clear | stat | clear statistics counters |
| ta_print | stat | print statistics |

Referring to FIG. 1, in operation, at step S10 the simulator is launched. At step S12, the default state is set. Various settings can be made here, such as the default mode being functional simulation mode, etc.

At step S14, user commands are accepted. For example, verification and test programs, applications, etc., can be loaded at this step. Commands to exercise and test a particular portion of a design can also be entered at this step. The type of simulation (performance or functional) can be set; i.e., changed from the default setting. Additionally, the number of instructions to be executed under a given mode (performance or functional) can be set at this point. Breakpoints (e.g., addresses, conditions, etc.) can also be set at this point so that the simulation returns to step S14 after the breakpoint is triggered. One can also turn on and off caches, etc. at this point.

At step S16, the initial state is set (i.e., the simulator is initialized). At step S18, functional simulation begins. It should be understood that functional simulation can be considered a subset of performance simulation in one embodiment. That is, performance simulation includes functional simulation.

At step S20, the simulation mode (functional or performance) is checked. This check can be done before or after or at the same time that functional simulation begins. This check can be used to guard a number of instructions to execute in a given mode. For example, if at step S14 the user chooses to execute 100 instructions in functional simulation mode, then the mode check ensures that functional simulation only is performed for these 100 instructions. Likewise, if the user chooses to execute these 100 instructions in performance simulation mode, then this happens at step S26. However, since functional simulation can be considered to be a subset of performance simulation in one embodiment, functional simulation is also taking place.

At step S22, if functional simulation mode was chosen, then functional statistics are computed and gathered for display, printing and/or saving. Some examples of the types of statistics computed and gathered are the number of instructions that were executed, the values of certain variables, how many times certain functions were called, the path taken and the dynamic execution sequences of instructions.

At step S24, a check is made to see if the program (the application running on the simulator) has ended. If not, then the simulator returns to step S14 where user commands can again be accepted. For example, the user may now want to simulate 150 instructions in performance simulation mode with a first cache enabled and a second cache disabled.

Figure 2:
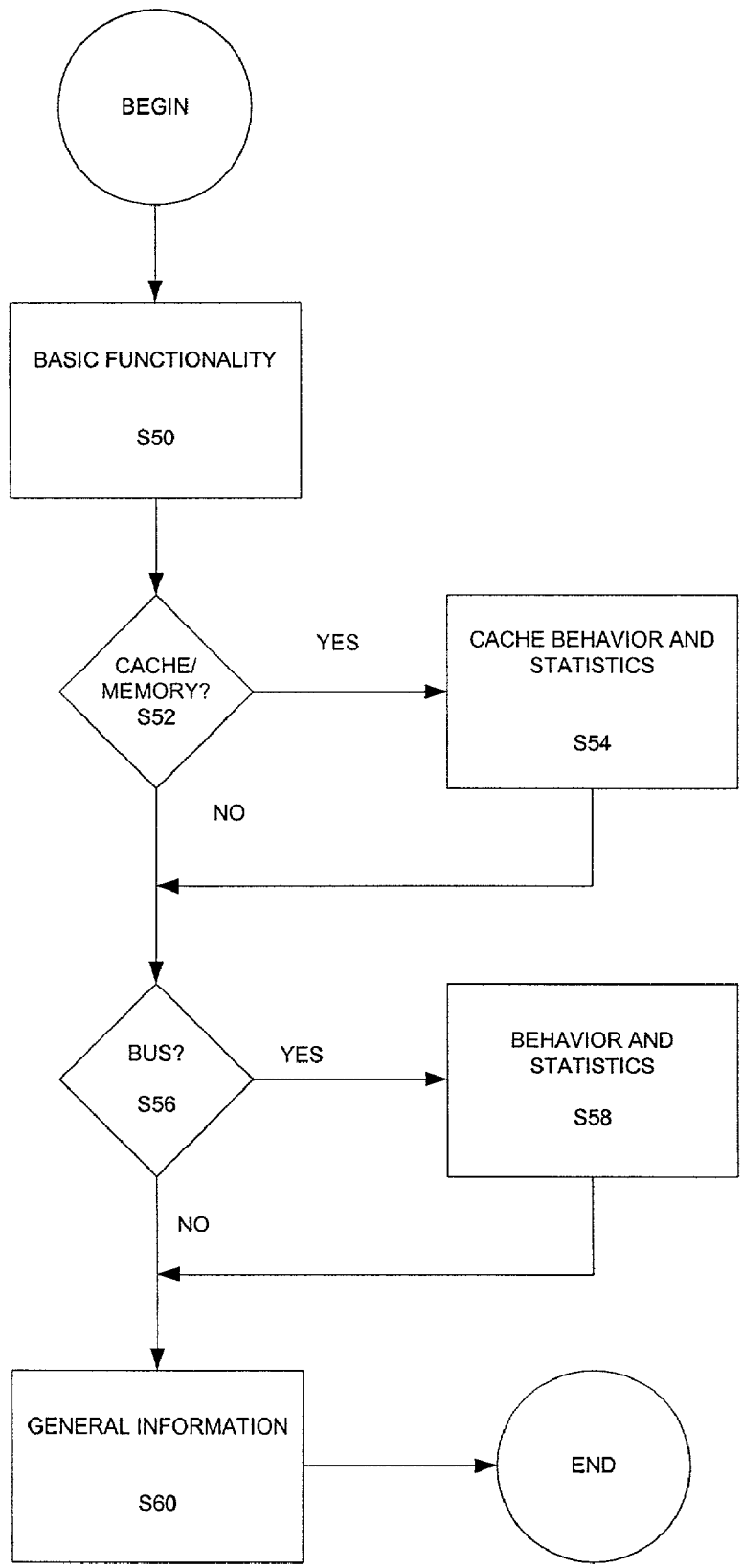
FIG. 2 is a flow diagram according to an embodiment of the present invention.

Turning now to FIG. 2, the simulator goes to step S50 if performance simulation was invoked (step S26 of FIG. 1). Basic performance simulation includes but is not limited to pipeline flows, functional unit usage, instruction dependency checks and branch penalties. At step S52, the program examines which caches, memories, etc. are to be considered (this might have been selected in step S14 of FIG. 1). At step S54, cache, etc., behavior and statistics are computed if appropriate.

If not, then the program goes to step S56. This step can be done before, after or at the same time at step S52. At this point, the program determines which bus or busses are to be analyzed (this might have been selected in step S14 of FIG. 1). At step S56, bus behavior and statistics are computed if appropriate. At step S60, general information is computed and gathered which can be stored, printed and/or displayed. Next, the program returns to step S24 of FIG. 1. It is noteworthy that step combinations S52/S54 and S56/S58 are included for illustrative purposes. Any number of suitable step combinations that provide various functionality can be included in any suitable order.

In one embodiment, the accuracy of the performance simulation can be altered as well. This can be in step S14 of FIG. 1. One must weigh the cost in simulation time against the benefit of increased accuracy. Thus, it has been shown that the user is able to select one or more of a plurality of code portions for performance simulation, in addition to the functional simulation, and at the same time adjust the accuracy of the performance simulation. The accuracy of the performance simulation can be adjusted for different code portions independently.

It is noteworthy that the different modes (performance and functional simulation) can be invoked within a single simulation program execution run. Moreover, a given portion of code can be analyzed using one mode in one program run and using another mode in a distinct program run.

Figure 3:
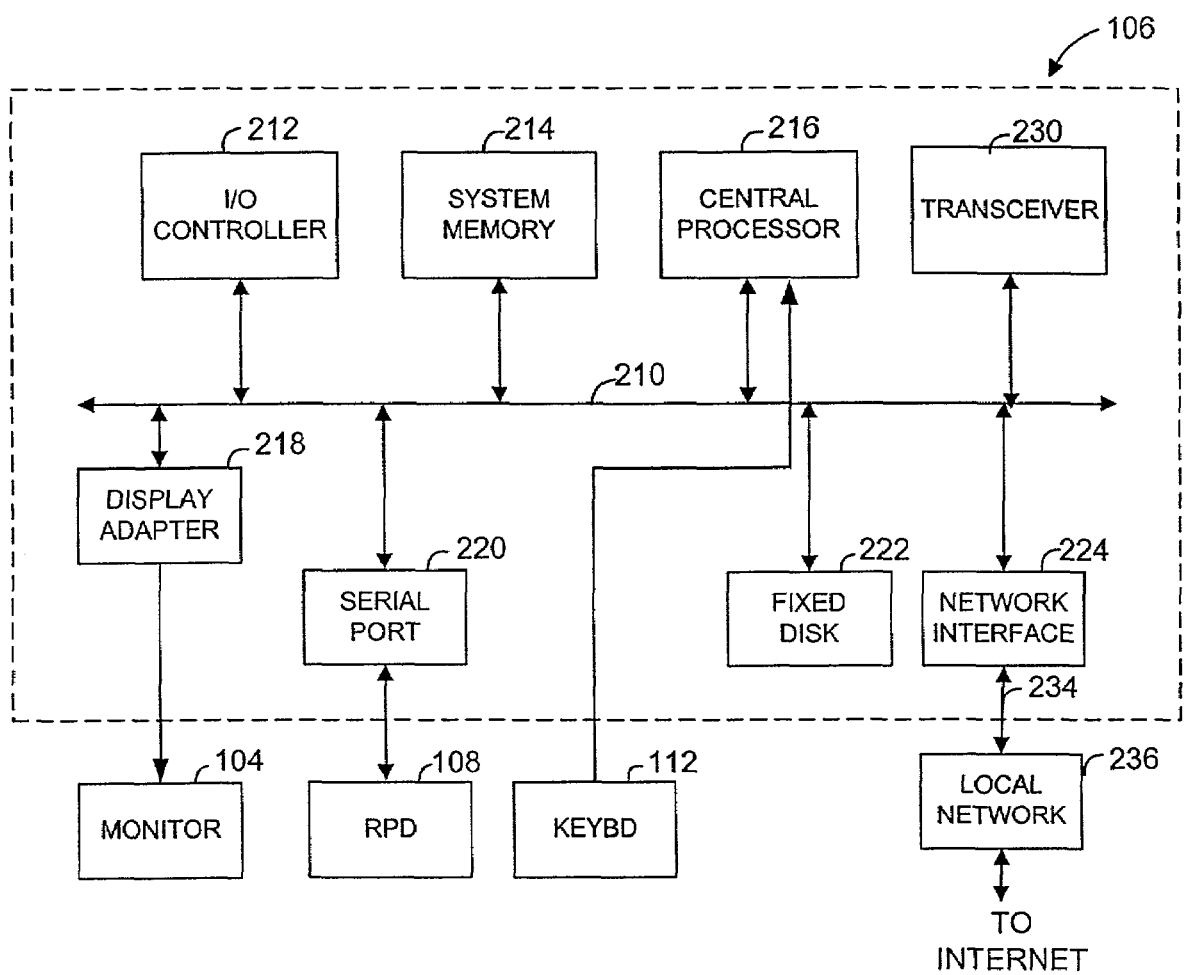
FIG. 3 illustrates subsystems of an exemplary computer system for use with the present invention.

FIG. 3 illustrates subsystems found in one exemplary computer system that can be used in accordance with embodiments of the present invention. Computers can be configured with many different hardware components and can be made in many dimensions and styles (e.g., laptop, palmtop, server, workstation and mainframe). Thus, any hardware platform suitable for performing the processing described herein is suitable for use with the present invention.

Subsystems within are directly interfaced to an internal bus 210. The subsystems include input/output (I/O) controller 212, system random access memory (RAM) 214, central processing unit (CPU) 216, serial port 220, fixed disk 222 and network interface adapter 224. The use of the bus allows each of the subsystems to transfer data among the subsystems and, most importantly, with the CPU. External devices can communicate with the CPU or other subsystems via the bus by interfacing with a subsystem on the bus.

FIG. 3 is illustrative of one suitable configuration for providing a system in accordance with the present invention.

Subsystems, components or devices other than those shown in FIG. 3 can be added without deviating from the scope of the invention. A suitable computer system can also be achieved without using all of the subsystems shown in FIG. 3. Other subsystems such as a CD-ROM drive, graphics accelerator, etc., can be included in the configuration without affecting the performance of the system included in the present invention.

One embodiment according to the present invention is related to the use of an apparatus, such as the computer system, for implementing a simulator according to embodiments of the present invention. The processor 216 can execute one or more sequences of one or more instructions contained in the system memory 214. Such instructions may be read into memory 214 from a computer-readable medium, such as a fixed disk 222. Execution of the sequences of instructions contained in the memory 214 causes the processor to perform the process steps described herein. One or more processors in a multi-processing arrangement may also be employed to execute the sequences of instructions contained in the memory. In alternative embodiments, hard-wired circuitry may be used in place of or in combination with software instructions to implement the invention. Thus, embodiments of the invention are not limited to any specific combination of hardware circuitry and software.

The terms "computer-readable medium" and "computer-readable media" as used herein refer to any medium or media that participate in providing instructions to the processor 214 for execution. Such media can take many forms, including, but not limited to, non-volatile media, volatile media and transmission media. Non-volatile media include, for example, optical or magnetic disks, such as a fixed disk 222. Volatile media include dynamic memory, such as memory 214. Transmission media include coaxial cables, copper wire and fiber optics, including the wires that comprise the bus 210. Transmission media can also take the form of acoustic or light waves, such as those generated during radio frequency (RF) and infra-red (IR) data communications. Common forms of computer-readable media include, for example, a floppy disk, a flexible disk, a hard disk, magnetic tape, any other magnetic medium, a CD-ROM disk, DVD, any other optical medium, punch cards, paper tape, any other physical medium with patterns of holes, a RAM, a PROM, an EPROM, a FLASH-EPROM, any other memory chip or cartridge, a carrier wave, or any other medium from which a computer can read.

Various forms of computer-readable media may be involved in carrying one or more sequences of one or more instructions to processor 216 for execution. The bus carries the data to the memory 214, from which the processor retrieves and executes the instructions. The instructions received by the memory can optionally be stored on the fixed disk 222 either before or after execution by the processor.

Many subsystem configurations are possible. FIG. 3 is illustrative of but one suitable configuration. Subsystems, components or devices other than those shown in FIG. 3 can be added. A suitable computer system can be achieved without using all of the subsystems shown in FIG. 3.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method of simulating a system, the method comprising:

modeling the system to be simulated using computer code to produce a system model comprising at least a first portion and a second portion;

in a simulator, performing simulation in a functional simulation mode having a first accuracy level for at least a first portion of code comprising the first portion of the system model, the behavior of the system represented by the first portion of code being simulated in the functional simulation mode without regard to execution time to thereby obtain information about functionality of the first portion of the simulated system; and in the same simulator, performing simulation in a performance simulation mode having a second accuracy level different from the first accuracy level for at least a second portion of code comprising the second portion of the system model, the behavior of system represented by the second portion of code being simulated in the performance simulation mode with regard to execution time to thereby obtain information about the performance of the second portion of the simulated system.

2. The method of claim 1, wherein the different modes are invoked within a single simulation program execution run.

3. The method of claim 1, further comprising adjusting the second accuracy level of the second performance simulation mode.

4. The method of claim 3, wherein the second portion of code includes two portions of code, and the method further comprises adjusting the second accuracy level for the two portions of code independently of each other.

5. A simulation system for simulating the performance of an external system, the simulation system comprising:

a module for performing simulation in a functional simulation mode having a first accuracy level for at least a first portion of code that models at least a first portion of the external system, the behavior of the first portion of the external system modeled by the first portion of code being simulated in the functional simulation mode without regard to execution time to thereby obtain information about functionality of the first portion of the external system; and a module for performing simulation in a performance simulation mode having a second accuracy level different from the first accuracy level for at least a second portion of code that models at least a second portion of the external system, the behavior of the second portion of the external system modeled by the second portion of code being simulated in the performance simulation mode with regard to execution time to thereby obtain information about the performance of the second portion of the external system.

6. The system of claim 5, wherein the different modes are invoked within a single simulation program execution run.

7. The system of claim 5, further comprising a module for facilitating adjustment of the second accuracy of the second performance simulation mode.

8. The system of claim 5, wherein the second portion of code includes two portions of code and the system further comprises a module for facilitating the adjustment of the second accuracy of the performance simulation mode for the two portions of code independently of each other.

9. The method of claim 1 wherein the step of modeling the system to be simulated using computer code includes modeling all of the system to be simulated;

the step of performing simulation in a functional simulation mode includes performing a functional simulation on all of the external system;

the step of performing simulation in a performance simulation mode includes performing a performance simulation at least a part of the external system; and the functional simulation mode and the performance simulation mode are performed during a single simulation program execution run.

10. The system of claim 5 wherein all of the system to be simulated is modeled using computer code;

the module for performing simulation in a functional simulation mode performs a functional simulation on all of the external system;

the module for performing simulation in a performance simulation mode performs simulation of at least a part of the external system; and the modules for performing the functional simulation mode and the performance simulation mode are invoked during a single simulation program execution run.

* * * * *